United States Patent
Gschwind

(10) Patent No.: US 10,810,104 B2
(45) Date of Patent: *Oct. 20, 2020

(54) DEBUGGING OF PREFIXED CODE

(71) Applicant: International Business Machines Corporation, Armonk, NY (US)

(72) Inventor: Michael K. Gschwind, Chappaqua, NY (US)

(73) Assignee: International Business Machines Corporation, Arrnonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/447,463

(22) Filed: Jun. 20, 2019

(65) Prior Publication Data

US 2019/0317876 A1    Oct. 17, 2019

Related U.S. Application Data

(63) Continuation of application No. 15/841,814, filed on Dec. 14, 2017, now Pat. No. 10,365,990, which is a
(Continued)

(51) Int. Cl.
*G06F 11/36* (2006.01)
*G06F 9/38* (2018.01)
(Continued)

(52) U.S. Cl.
CPC ........ *G06F 11/362* (2013.01); *G06F 9/30185* (2013.01); *G06F 9/38* (2013.01);
(Continued)

(58) Field of Classification Search
CPC ........ G06F 11/14; G06F 11/36; G06F 11/362; G06F 13/24; G06F 9/30043; G06F 9/301;
(Continued)

(56) References Cited

U.S. PATENT DOCUMENTS 5,303,358 A * 4/1994 Baum ................. G06F 9/30185
                                                  712/226
5,491,808 A * 2/1996 Geist, Jr. ............. G06F 11/3495
                                                  711/100
(Continued)

FOREIGN PATENT DOCUMENTS

| EP | 1351135 | 12/2010 |
| GB | 2486905 | 4/2012 |

OTHER PUBLICATIONS

Binder, Walter et al., "Advanced Java Bytecode Instrumentation," Proceedings of the 5th International Symposium on Principles and Practice of Programming in Java, Sep. 2007, pp. 135-144 (Year: 2007).*

(Continued)

*Primary Examiner* — Wei Y Zhen
*Assistant Examiner* — Mohammed N Huda
(74) *Attorney, Agent, or Firm* — Heslin Rothenberg Farley & Mesiti P.C.; Steven Chiu, Esq.

(57) ABSTRACT

A debugging capability that enables the efficient debugging of code that has prefixes, referred to herein as prefixed code. To debug application code, in which the application code includes a prefixed instruction to be modified by a prefix, a trap is provided. The trap is configured to report a presence of the prefix, but to otherwise perform the trap functions absent the prefix; i.e., the prefix is otherwise ignored in the processing of the trap.

20 Claims, 13 Drawing Sheets

Related U.S. Application Data continuation of application No. 14/871,985, filed on Sep. 30, 2015, now Pat. No. 9,870,305.

(51) Int. Cl.
*G06F 9/30* (2018.01)
*G06F 9/32* (2018.01)
*G06F 9/355* (2018.01)

(52) U.S. Cl.
CPC ........ *G06F 9/3017* (2013.01); *G06F 9/30043* (2013.01); *G06F 9/324* (2013.01); *G06F 9/355* (2013.01)

(58) Field of Classification Search
CPC .... G06F 9/3017; G06F 9/30185; G06F 9/324; G06F 9/355; G06F 9/38; G06F 9/466; G06F 9/467; G06F 9/526; G06F 9/528; G06F 8/443; G06F 3/0619; G06F 3/0629; G06F 3/0673; G06F 2201/805; G06F 2201/825; G06F 2201/84
USPC .................. 717/124, 129; 711/150; 712/213; 714/15
See application file for complete search history.

(56) References Cited

U.S. PATENT DOCUMENTS

| | | | |
|---|---|---|---|
| 5,537,629 A | 7/1996 | Brown et al. | |
| 5,809,273 A | 9/1998 | Favor | |
| 5,822,559 A * | 10/1998 | Narayan et al. .... | G06F 9/30152 712/214 |
| 5,867,701 A | 2/1999 | Brown et al. | |
| 5,944,841 A | 8/1999 | Christie | |
| 6,014,735 A | 1/2000 | Chennupaty et al. | |
| 6,058,464 A | 5/2000 | Taylor | |
| 6,167,505 A | 12/2000 | Kubota et al. | |
| 6,240,506 B1 | 5/2001 | Miller | |
| 6,260,134 B1 | 7/2001 | Zuraski, Jr. et al. | |
| 6,275,927 B2 | 8/2001 | Roberts | |
| 6,336,178 B1 * | 1/2002 | Favor .................... | G06F 9/324 712/209 |
| 6,970,998 B1 | 11/2005 | Favor | |
| 7,181,596 B2 | 2/2007 | Henry et al. | |
| 7,487,338 B2 | 2/2009 | Matsuo | |
| 9,329,869 B2 | 5/2016 | Gschwind et al. | |
| 9,870,305 B2 | 1/2018 | Gschwind | |
| 9,870,308 B2 | 1/2018 | Gschwind | |
| 10,235,271 B2 | 3/2019 | Gschwind | |
| 2003/0236965 A1 | 12/2003 | Shaeffer | |
| 2004/0186981 A1 | 9/2004 | Christie et al. | |
| 2004/0250053 A1 | 12/2004 | McGrath et al. | |
| 2005/0033940 A1 | 2/2005 | McGrath | |
| 2007/0260849 A1 | 11/2007 | Chen et al. | |
| 2008/0215856 A1 | 9/2008 | Gschwind et al. | |
| 2008/0282066 A1 | 11/2008 | May | |
| 2010/0064119 A1 | 3/2010 | Arakawa | |
| 2010/0332803 A1 | 12/2010 | Yoshida et al. | |
| 2011/0035745 A1 | 2/2011 | Li et al. | |
| 2012/0331273 A1 | 12/2012 | Smith et al. | |
| 2013/0086363 A1 | 4/2013 | Gschwind et al. | |
| 2013/0275723 A1 | 10/2013 | Combs | |
| 2014/0095833 A1 | 4/2014 | Gschwind et al. | |
| 2014/0164741 A1 | 6/2014 | Gschwind et al. | |
| 2017/0090923 A1 | 3/2017 | Gschwind | |
| 2017/0090931 A1 | 3/2017 | Frazier et al. | |
| 2017/0090932 A1 | 3/2017 | Frazier et al. | |
| 2017/0090939 A1 | 3/2017 | Gschwind | |
| 2017/0090940 A1 | 3/2017 | Gschwind | |
| 2017/0091064 A1 | 3/2017 | Gschwind | |
| 2018/0113784 A1 | 4/2018 | Gschwind | |
| 2018/0113785 A1 | 4/2018 | Gschwind | |
| 2019/0188112 A1 | 6/2019 | Gschwind | |

OTHER PUBLICATIONS

Mell et al., "The NIST Definition of Cloud Computing," National Institute of Standards and Technology, Information Technology Laboratory, Special Publication 800-145, Sep. 2011, pp. 1-7.

"z/Architecture Principles of Operation," IBM® Publication No. SA22-7832-10, Eleventh Edition, Mar. 2015, pp. 1-1732.

"Power ISA™ Version 2.07B," International Business Machines Corporation, Apr. 9, 2015, pp. 1-1527.

"Intel® 64 and IA-32 Architectures Developer's Manual: vol. 2A, Instructions Set Reference, A-L," Order No. 253666-045US, Jan. 2013, pp. 1-524.

"Intel® 64 and IA-32 Architectures Developer's Manual: vol. 2B, Instructions Set Reference, M-Z," Order No. 253667-045US, Jan. 2013, pp. 1-550.

Binder, Walter et al., "Advanced Java Bytecode Instrumentation," Proceedings of the 5th International Symposium on Principles and Practice of Programming in Java, Sep. 2007, pp. 135-144.

List of IBM Patents or Patent Applications Treated as Related dated Jul. 9, 2019, pp. 1-3.

* cited by examiner

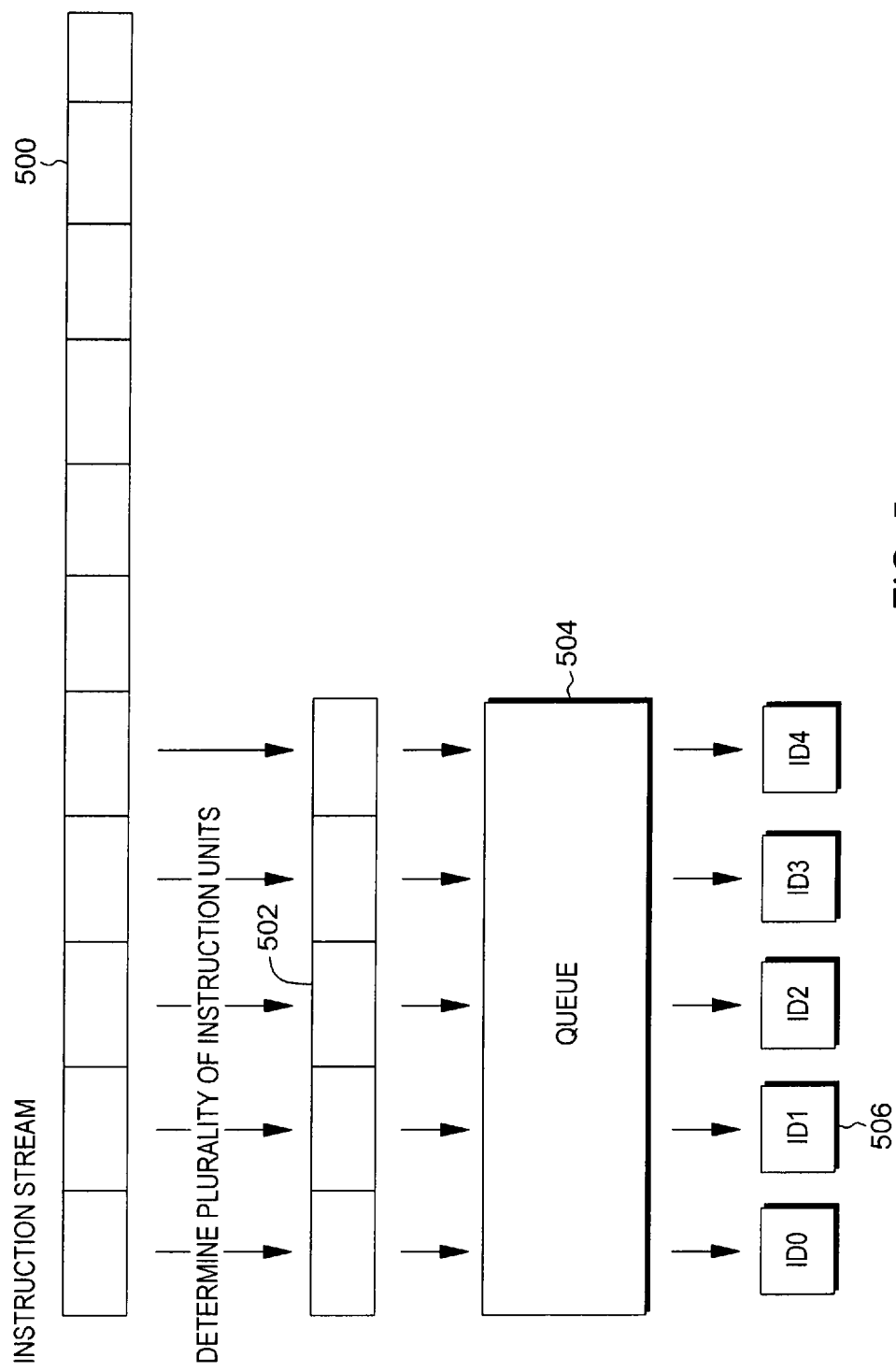

DEBUGGING OF PREFIXED CODE

BACKGROUND

One or more aspects relate, in general, to processing within a computing environment, and in particular, to the debugging of computer code.

The debugging of code is performed to find errors in the code that prevent correct operation of the code. For debugging, as well as other services, such as, performance monitoring, program tracing, and so forth, systems provide ways to manage and track the instructions of the code. However, when applications include certain types of instructions, such as prefix instructions, the managing is to take into account these types of instructions, which may be handled differently.

Prefix instructions are used to modify subsequent instructions, and in one example, are used to extend addressability. For instance, different computer system architectures offer data addressing with different displacements providing varying sizes of directly addressable data ranges. As examples, the Power Architecture, offered by International Business Machines Corporation, Armonk, N.Y., provides data addressing with a 16-bit displacement providing a 64 KB (kilobyte) directly addressable data range, while the x86 architecture, offered by Intel Corporation, provides data addressing with a 32-bit displacement providing a 4 GB (gigabyte) directly addressable data range.

The size of the directly addressable data range impacts and limits software applications. For instance, the size of global data areas, such as a Global Offset Table or Table of Contents used by software applications to locate global variables, is limited by the size of the directly addressable data range. As an example, if 16 bits is the maximum size of an immediate offset from a base register, then the size of the directly usable global data area is limited to 64 KB.

SUMMARY

Shortcomings of the prior art are overcome and additional advantages are provided through the provision of a computer program product for facilitating debugging of application code. The computer program product includes a computer readable storage medium readable by a processing circuit and storing instructions for execution by the processing circuit for performing a method. The method includes providing, by a processor, a trap to be used in debugging of application code, the application code including a prefixed instruction defined to be modified by a prefix, and the trap to replace the prefixed instruction, the trap configured to report a presence of the prefix and to ignore the prefix in execution; and using the trap to debug the application code. In one aspect, a trap is configured to be used with prefixed code, in which the prefix does not affect how the trap executes.

In one embodiment, the prefix is provided via a prefix instruction placed in the application code prior to the prefixed instruction. As an example, the prefix instruction and the prefixed instruction are individual instructions initially provided separately to decode units to be decoded. This facilitates processing, including the decoding of the instructions.

As one example, the trap is to replace the prefixed instruction. The trap is placed at a selected location in the application code (e.g., over the prefixed instruction to replace the prefixed instruction). Further, in one embodiment, the trap includes a trap instruction.

In a further aspect, the trap instruction is executed, and the executing ignores the prefix. However, in one embodiment, the presence of the prefix is reported. For example, at least one of an address of the prefix instruction or an indication of the prefix instruction is reported. Further, the reporting may include reporting a length of the prefix. The reporting may facilitate the restarting of execution.

In yet a further aspect, another trap is used to debug the application code. The other trap is to be placed at a chosen location within the application code, the chosen location being one of over the prefix instruction or over another prefixed instruction.

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 5 depicts one example of a plurality of instruction decode units receiving a plurality of instruction units, in accordance with one or more aspects of the present invention;

DETAILED DESCRIPTION

In accordance with an aspect of the present invention, a debugging capability is provided that enables the efficient debugging of code that has prefixes (referred to herein as prefixed code). In particular, suitable semantics for debugging in the presence of prefixes is provided. This includes, but is not limited to, managing the use of breakpoints and traps, as well as concurrent code modification during execution. In one aspect of debugging, code updating is performed in order to insert trap instructions in order to establish breakpoints in the code being debugged. As examples, a breakpoint may be set either over a prefix instruction or a prefixed instruction.

Figure 1A:
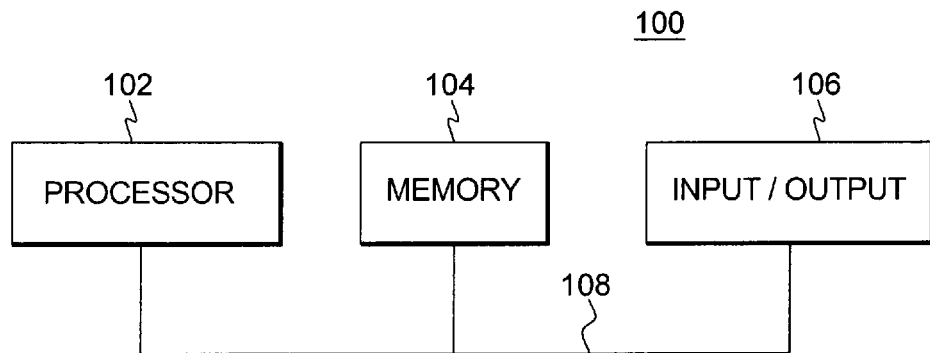
FIG. 1A depicts one example of a computing environment to incorporate and/or use one or more aspects of the present invention.

One embodiment of a computing environment to incorporate and use one or more aspects of a debug facility is described with reference to FIG. 1A. A computing environment 100 includes, for instance, a processor 102 (e.g., a central processing unit), a memory 104 (e.g., main memory), and one or more input/output (I/O) devices and/or interfaces 106 coupled to one another via, for example, one or more buses 108 and/or other connections.

In one example, processor 102 is based on the z/Architecture offered by International Business Machines Corporation, and is part of a server, such as the System z server, which is also offered by International Business Machines Corporation and implements the z/Architecture. One embodiment of the z/Architecture is described in an IBM® publication entitled, "z/Architecture Principles of Operation," IBM® Publication No. SA22-7832-10, Eleventh Edition, March 2015, which is hereby incorporated by reference herein in its entirety. In one example, the processor executes an operating system, such as z/OS, also offered by International Business Machines Corporation. IBM®, Z/ARCHITECTURE® and Z/OS® (as well as Z/VM® referenced below) are registered trademarks of International Business Machines Corporation, Armonk, N.Y., USA. Other names used herein may be registered trademarks, trademarks, or product names of International Business Machines Corporation or other companies.

In a further embodiment, processor 102 is based on the Power Architecture offered by International Business Machines Corporation. One embodiment of the Power Architecture is described in "Power ISA™ Version 2.07B," International Business Machines Corporation, Apr. 9, 2015, which is hereby incorporated by reference herein in its entirety. POWER ARCHITECTURE® is a registered trademark of International Business Machines Corporation, Armonk, N.Y.

In yet a further embodiment, processor 102 is based on an Intel architecture offered by Intel Corporation. One embodiment of the Intel architecture is described in "Intel® 64 and IA-32 Architectures Developer's Manual: Vol. 2B, Instructions Set Reference, A-L," Order Number 253666-045US, January 2013, and "Intel® 64 and IA-32 Architectures Developer's Manual: Vol. 2B, Instructions Set Reference, M-Z," Order Number 253667-045US, January 2013, each of which is hereby incorporated by reference herein in its entirety. Intel® is a registered trademark of Intel Corporation, Santa Clara, Calif.

Figure 1B:
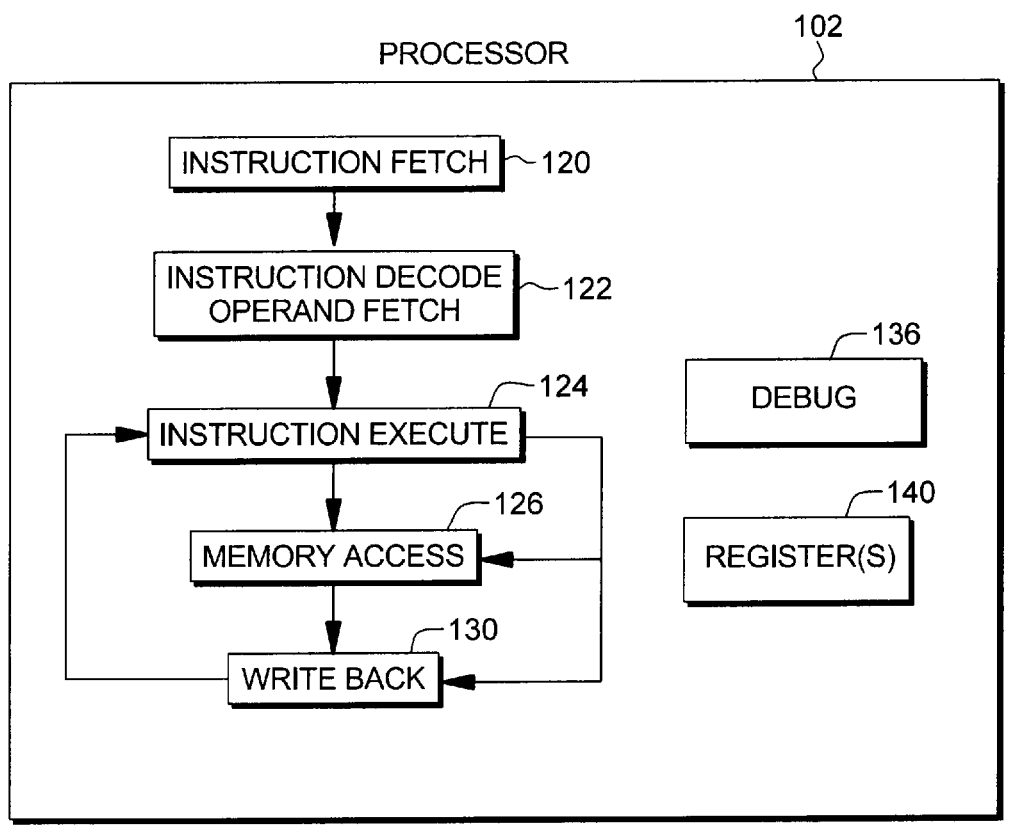
FIG. 1B depicts further details of a processor of the computing environment of FIG. 1A, in accordance with an aspect of the present invention.

Processor 102 includes a plurality of functional components used to execute instructions. As depicted in FIG. 1B, these functional components include, for instance, an instruction fetch component 120 to fetch instructions to be executed; an instruction decode unit 122 to decode the fetched instructions and to obtain operands of the decoded instructions; an instruction execute component 124 to execute the decoded instructions; a memory access component 126 to access memory for instruction execution, if necessary; and a write back component 130 to provide the results of the executed instructions. One or more of these components may, in accordance with an aspect of the present invention, provide debug functionality by including at least a portion of or having access to a debug component 136. This functionality is described in further detail below.

Processor 102 also includes, in one embodiment, one or more registers 140 to be used by one or more of the functional components.

Figure 2:
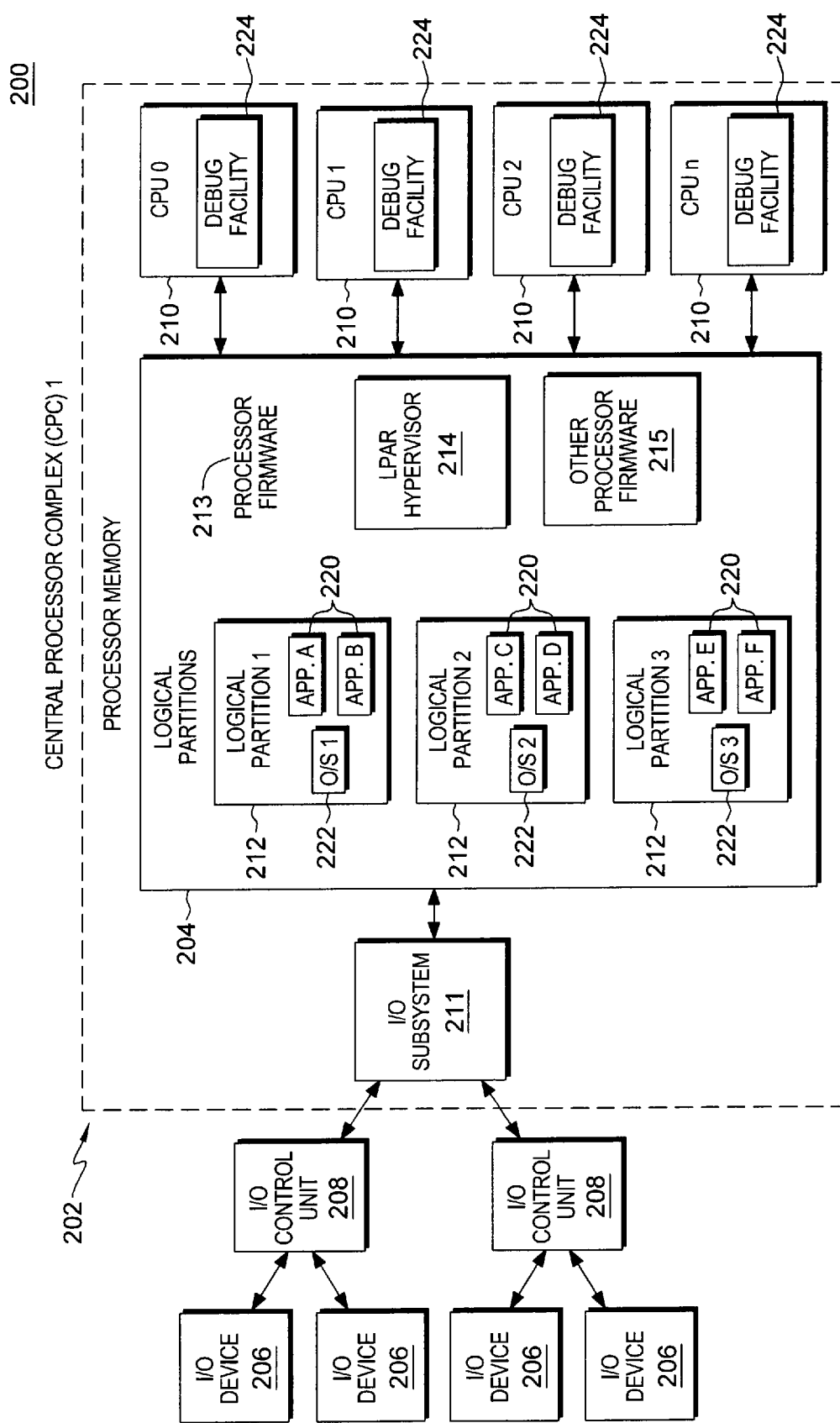
FIG. 2 depicts another embodiment of a computing environment to incorporate and/or use one or more aspects of the present invention.

Another embodiment of a computing environment to incorporate and use one or more aspects of the debug facility is described with reference to FIG. 2. In one example, a computing environment 200 is based on the z/Architecture, offered by International Business Machines (IBM®) Corporation, Armonk, N.Y. Computing environment 200 includes, for example, a central processor complex (CPC) 202 coupled to one or more input/output (I/O) devices 206 via one or more control units 208. Central processor complex 202 includes, for instance, a processor memory 204 (a.k.a., main memory, main storage, central storage) coupled to one or more central processors (a.k.a., central processing units (CPUs)) 210, and an input/output subsystem 211, each of which is described below.

Processor memory 204 includes, for example, one or more partitions 212 (e.g., logical partitions), and processor firmware 213, which includes, for instance, a logical partition hypervisor 214 and other processor firmware 215. One example of logical partition hypervisor 214 is the Processor Resource/System Manager (PRISM), offered by International Business Machines Corporation, Armonk, N.Y.

A logical partition functions as a separate system and has one or more applications 220, and optionally, a resident operating system 222 therein, which may differ for each logical partition. In one embodiment, the operating system is the z/OS operating system, the z/VM operating system, the z/Linux operating system, or the TPF operating system, offered by International Business Machines Corporation, Armonk, N.Y. Logical partitions 212 are managed by logical partition hypervisor 214, which is implemented by firmware running on processors 210. As used herein, firmware includes, e.g., the microcode and/or millicode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

Central processors 210 are physical processor resources allocated to the logical partitions. In particular, each logical partition 212 has one or more logical processors, each of which represents all or a share of a physical processor 210 allocated to the partition. The logical processors of a particular partition 212 may be either dedicated to the partition, so that the underlying processor resource 210 is reserved for that partition; or shared with another partition, so that the underlying processor resource is potentially available to another partition. In one example, one or more of the CPUs include aspects of the debug facility 224 described herein.

Input/output subsystem 211 directs the flow of information between input/output devices 206 and main storage 204. It is coupled to the central processing complex, in that it can be a part of the central processing complex or separate therefrom. The I/O subsystem relieves the central processors of the task of communicating directly with the input/output devices and permits data processing to proceed concurrently with input/output processing. To provide communications, the I/O subsystem employs I/O communications adapters. There are various types of communications adapters including, for instance, channels, I/O adapters, PCI cards, Ethernet cards, Small Computer Storage Interface (SCSI) cards, etc. In the particular example described herein, the I/O communications adapters are channels, and therefore, the I/O subsystem is referred to herein as a channel subsystem. However, this is only one example. Other types of I/O subsystems can be used.

The I/O subsystem uses one or more input/output paths as communication links in managing the flow of information to or from input/output devices 206. In this particular example, these paths are called channel paths, since the communication adapters are channels.

Figure 3A:
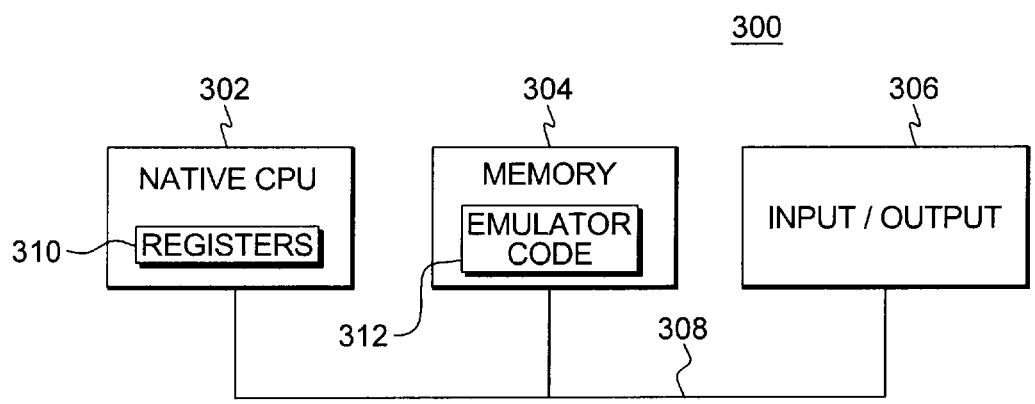
FIG. 3A depicts yet a further embodiment of a computing environment to incorporate and/or use one or more aspects of the present invention.

Another embodiment of a computing environment to incorporate and use one or more aspects of the debug facility is described with reference to FIG. 3A. In this example, a computing environment 300 includes, for instance, a native central processing unit (CPU) 302, a memory 304, and one or more input/output devices and/or interfaces 306 coupled to one another via, for example, one or more buses 308 and/or other connections. As examples, computing environment 300 may include a PowerPC processor or a pSeries server offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Native central processing unit 302 includes one or more native registers 310, such as one or more general purpose registers and/or one or more special purpose registers used during processing within the environment. These registers include information that represents the state of the environment at any particular point in time.

Moreover, native central processing unit 302 executes instructions and code that are stored in memory 304. In one particular example, the central processing unit executes emulator code 312 stored in memory 304. This code enables the computing environment configured in one architecture to emulate another architecture. For instance, emulator code 312 allows machines based on architectures other than the z/Architecture, such as PowerPC processors, pSeries servers, HP Superdome servers or others, to emulate the z/Architecture and to execute software and instructions developed based on the z/Architecture.

Figure 3B:
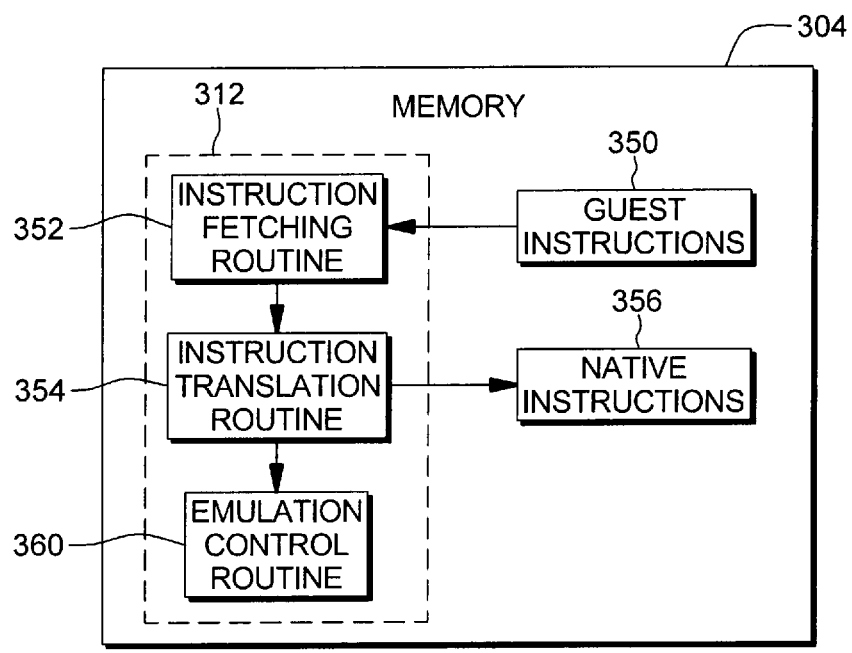
FIG. 3B depicts further details of the memory of the computing environment of FIG. 3A, in accordance with an aspect of the present invention.

Further details relating to emulator code 312 are described with reference to FIG. 3B. Guest instructions 350 stored in memory 304 comprise software instructions (e.g., correlating to machine instructions) that were developed to be executed in an architecture other than that of native CPU 302. For example, guest instructions 350 may have been designed to execute on a z/Architecture processor 102, but instead, are being emulated on native CPU 302, which may be, for example, an Intel Itanium II processor. In one example, emulator code 312 includes an instruction fetching routine 352 to obtain one or more guest instructions 350 from memory 304, and to optionally provide local buffering for the instructions obtained. It also includes an instruction translation routine 354 to determine the type of guest instruction that has been obtained and to translate the guest instruction into one or more corresponding native instructions 356. This translation includes, for instance, identifying the function to be performed by the guest instruction and choosing the native instruction(s) to perform that function.

Further, emulator code 312 includes an emulation control routine 360 to cause the native instructions to be executed. Emulation control routine 360 may cause native CPU 302 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 356 may include loading data into a register from memory 304; storing data back to memory from a register; or performing some type of arithmetic or logic operation, as determined by the translation routine.

Each routine is, for instance, implemented in software, which is stored in memory and executed by native central processing unit 302. In other examples, one or more of the routines or operations are implemented in firmware, hardware, software or some combination thereof. The registers of the emulated processor may be emulated using registers 310 of the native CPU or by using locations in memory 304. In embodiments, guest instructions 350, native instructions 356 and emulator code 312 may reside in the same memory or may be disbursed among different memory devices.

The computing environments described above are only examples of computing environments that can be used. Other environments, including but not limited to, other non-partitioned environments, other partitioned environments, and/or other emulated environments, may be used; embodiments are not limited to any one environment.

Each computing environment is capable of being configured to include one or more aspects of the present invention. For instance, each may be configured to provide debugging capabilities, including dynamic code updating of applications that include prefix instructions.

Figure 4A:
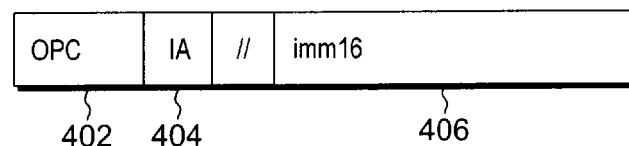
FIGS. 4A-4C depict various examples of a prefix instruction used in accordance with one or more aspects of the present invention.

One example of a prefix instruction is described with reference to FIG. 4A. In one example, a prefix instruction 400A includes, for instance, an operation code (OPC) field 402 including an operation code that specifies a prefix instruction; an instruction address (IA) field 404 including an indicator indicating whether an address based on a successor instruction, such as the current instruction address (e.g., the program counter) of a successor instruction (referred to as a prefixed instruction), is to be used as a base address for the successor instruction, thus overriding one or more operands of the successor instruction; and at least one immediate (imm16) field 406 including a value (e.g., 16 bits) that is to be employed with (e.g., added to) one or more operands of the successor instruction. The instruction address and the value(s) are referred to herein as a prefix. The prefix is specified by the prefix instruction, as one example.

Figure 4B:
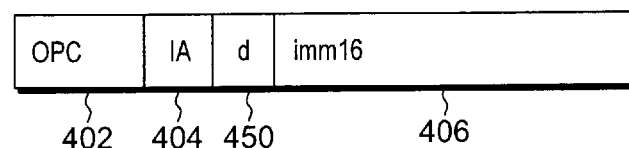
Figure 4C:
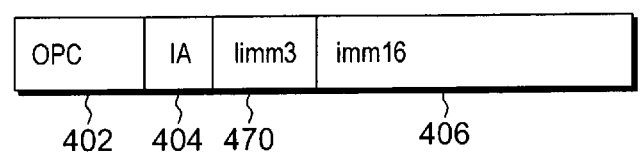

In a further embodiment, as shown in FIG. 4B, a prefix instruction 400B may include a displacement specifier field (d) 450 that indicates whether additional immediate bits are to be used.

In yet a further embodiment, a prefix instruction 400C includes a further immediate (limm3) field 470 including a value (e.g., 3 bits) which may be employed with (e.g., added to, OR'd with) low order bits of an immediate operand of the successor instruction, while the value in immediate field 406 may be employed with high order bits of an immediate operand. Additionally, limm3 may be used to override one or more bits of an immediate operand of the successor instruction. As examples, if an instruction has a DS immediate field (e.g., a Load Floating-Point Double Pair or a Store Floating-Point Double Pair instruction), then the operand of the field may be extended as follows: imm16||DS||limm3<1:2>; or in another example, imm16||DS<16:28>||limm3<0:2>. Many other possibilities exist. For instance, limm3 may be OR'd, e.g., (DS||0b00) OR limm3<0:2>. Again, other possibilities exist.

In one example, in operation of the prefix instruction (e.g., 400A, 400B, 400C), a special purpose register, referred to herein as SPRd, is updated to include values of the fields of the instruction. For instance, one field of the register (e.g., SPRd[val]) is set equal to the value in immediate field 406. Further, another field of the register (e.g., SPRd[IA]) is set equal to the instruction address indicator included in the prefix instruction (e.g., set to one to indicate that the current instruction address is to be used as a base address in the next instruction). In yet a further embodiment, another field of the register or an existing field (e.g., val) may include the value in immediate field 470. Other possibilities also exist. These values are then used in many types of instructions including D-form instructions that include displacements, x-form instructions (i.e., index form instructions computing a memory address as the sum of two registers, e.g., RA+RB), etc.

As one particular example, the prefix instruction may be used to override and/or alter operands of a Store Word instruction, which includes, for example, an opcode field having an operation code to specify a store word operation; and one or more operand fields including an RS field that includes a register having a value to be stored; and an RA field having a register that includes a value to be used to determine a storage address of a location in which to store the value of register RS. The instruction further includes a displacement field having data used in determining the storage address.

This instruction (referred to as the prefixed instruction) follows a prefix instruction, and in execution of the Store Word instruction, in one embodiment, if SPRd[IA]=a predefined value (e.g., 1), and optionally, RA=another predefined value (e.g., 0), then a variable (e.g., b) is set equal to the Store Word instruction address. Further, in one embodiment, additional bits are added to the value of the displacement field, a result of which is added to b. One example of pseudo-code for the Store Word instruction is as follows:

```
If (SPRd[IA]=1 && RA=0) then b = IA else
if RA = 0 then b β 0
else b β (RA)
EA β b + EXTS(SPRd[val]∪ D)
MEM(EA, 4) β (RS)32:63
SPRd = 0
```

Let the effective address (EA) be the sum of a base address specified by variable b and the sign extended concatenated value of the displacement field of the prefix instruction (e.g., captured in SPRd[val] in this example) and the displacement specified in the Store Word instruction. The base address variable b is initialized to the current instruction address, if, in one example, the IA prefix field is set in the prefix instruction to override the RA field, and if and only if the RA field specifies register 0. Otherwise, if the register value of 0 is specified in the RA field, the base address variable b is 0, and otherwise if a register number from 1 to 31 is specified, the base address b corresponds to the value stored in the specified register. $(RS)_{32:63}$ are stored into the word in storage addressed by EA. The prefix is cleared by resetting SPRd. Further, EXTS refers to extended sign and v refers to concatenation.

In a further embodiment, the value of RA is not checked. Thus, the pseudo-code is as follows:

```
If (SPRd[IA]=1) then b = IA else
if RA = 0 then b β 0
else b β (RA)
EA β b + EXTS(SPRd[val]∪ D)
MEM(EA, 4) β (RS)32:63
SPRd = 0
```

Let the effective address (EA) be the sum of b+d. The base address variable b is initialized to the current instruction address, if the IA prefix field is set in the prefix instruction in order to override the RA field, in one example. Otherwise, if the register value of 0 is specified in the RA field, the base address variable b is 0, and otherwise if a register number from 1 to 31 is specified, then the base address b corresponds to the value stored in the specified register. The displacement d is the sign extended concatenated value of the displacement bits specified by the prefix and the displacement bits specified by the store word instruction. $(RS)_{32:63}$ are stored into the word in storage addressed by EA. The prefix is cleared by resetting SPRd.

In one or more embodiments, the instruction address used to override the operand may be the current instruction address of the prefixed instruction, as indicated above, or it may be other addresses. As examples, it may be the address of the prefix, or the address of the prefix instruction. In yet another embodiment, it may be the address of the instruction following the prefixed instruction. Other addresses at a fixed positive or negative offset from the prefix, prefixed instruction, or the instruction following such instruction are also contemplated within the scope of aspects of the present invention. Many variations are possible.

Further, while the combination of portions of prefix provided and instruction provided displacements has been described as bits in one example hereinabove, the use of other combination functions are contemplated, such as the addition of shifted sign extended values, e.g., EXTS(SPRd [val])<<16+EXTS(d), the subtraction of values EXTS(SPRd [val])<<16−EXTS(d), the use of a bit-interleaving function EXTS(bit_interleave(SPRd[val], d)), or any other function adapted to combine two bit vectors, i.e., combine(SPRd [val],d). Many possibilities exist.

In yet another embodiment, a prefix instruction may be provided to specify additional addressing information, e.g., providing an index register to be included in conjunction with a base instruction specifying a base plus index addressing mode in order to enable the computation of addressing modes IA+RX+displacement in one embodiment. In one such embodiment, IA corresponds to an instruction address, RX to the contents of a specified index register and the displacement corresponds to at least the displacement of the base instruction, optionally further including additional displacement bits, when specified by a prefix in one embodiment. In another embodiment, a specified index, register Rx may be used to specify an index register to be used in conjunction with a non-overridden base address and a displacement, when used in conjunction with a base plus displacement address mode instruction to enable the computation of an addressing mode RA+RX+displacement when a base ISA (instruction set architecture) does not support such an addressing mode without the prefix. In one such embodiment, RA corresponds to the content of register RA (optionally forcing the value 0 when register, RA=0 is specified, in some embodiments), RX to the contents of a specified index register and the displacement corresponds to at least the displacement of the base instruction, optionally further including additional displacement bits, when specified by a prefix, in one embodiment.

The above instruction is of a reduced instruction set architecture (RISC). However, many other instructions may use one or more of the prefixing capabilities, described herein, including instructions in the RISC architecture, as well as instructions of other architectures, such as complex instruction set architectures (CISC). One such instruction is a Vector Load to Block Boundary instruction.

In one example, a Vector Load to Block Boundary instruction includes a plurality of fields including one or more opcode fields that includes a value specifying a vector load to block boundary operation; a vector register field ($V_1$) specifying a vector register to be used by the instruction; an index field ($X_2$), a base field ($B_2$) and a displacement field ($D_2$) to provide an address of an operand in memory (e.g., the contents of the general registers specified by the $X_2$ and $B_2$ fields are added to the contents of the $D_2$ field to form an address of a second operand); a mask field ($M_3$) used to provide the block boundary; and an RXB field providing a possible extension for the vector register field. In accordance with one or more aspects of the present invention, the value in the register specified by $B_2$ is ignored, and instead, the IA of the prefix instruction is used. Other fields may similarly be altered by the prefix instruction.

In operation, the first operand (value in the register specified in $V_1$) is loaded starting at the zero indexed byte element with bytes from the second operand. If a boundary condition is encountered, the rest of the first operand is unpredictable in one embodiment or model dependent in another embodiment.

Access exceptions are not recognized for second operand locations beyond the specified boundary. If no boundary is encountered, all byte elements of the first operand are loaded with data from storage.

If an IA prefix is specified, the value of $B_2$ is ignored, and the current instruction address, i.e., the instruction address of the next instruction, or other address in accordance with the specification of an IA prefix is used in lieu of the value in the base register to form the address of the second operand. That is, $B_2$ and thus, the operand are overridden.

The displacement ($D_2$) for VLBB is treated as a 12-bit unsigned integer. If a displacement prefix is specified (e.g., imm16 and/or limm3), the displacement includes the combined prefix-specified displacement and instruction specified displacement. In one embodiment, this is true if a displacement selector is specified. In one embodiment, the displacement combination is a concatenation of bit strings. In another optimization to align with fusion, it corresponds to the combination of an immediate shifted and immediate displacement, e.g., hd<<16+sign_ext(ld). Other possibilities exist.

Again, many other types of instructions and/or many other instructions may be altered by the prefix instruction.

The prefix instruction is used to modify a prefixed instruction. Thus, in accordance with one or more aspects, the prefix instruction and prefixed instruction are forwarded to decode units substantially in parallel.

One example of processing associated with decoding application code is described with reference to FIG. 5. As shown, an instruction stream 500 includes a plurality of instruction units 502. For the Power Architecture, each instruction unit is 4 bytes, and therefore, each instruction unit is the same size. However, in other examples, such as the z/Architecture, the size of the instruction unit is determined by one or more bytes of the instruction. In this particular example, five instruction units are processed in parallel, but in other embodiments, there may be more or less instruction units being processed in parallel. The instruction units are placed in a queue 504 and then passed to instruction decode units 506 (ID; e.g., ID0-ID4); also referred to herein as decoders or decoder units. Each instruction decode unit decodes its instruction unit.

Figure 6:
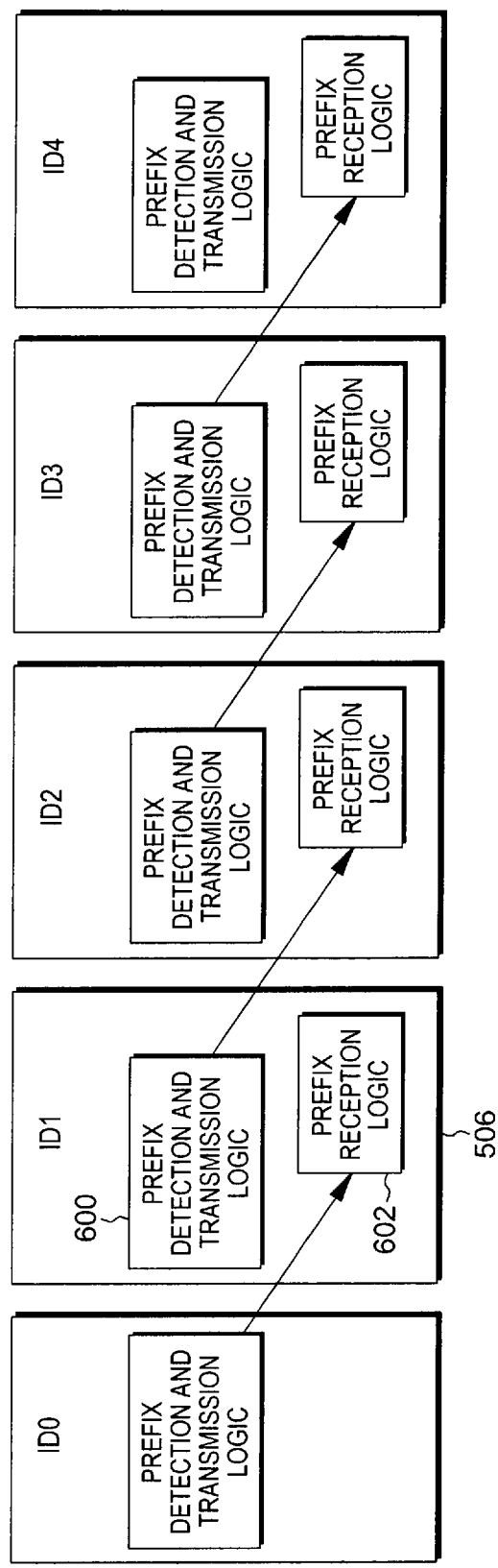
FIG. 6 depicts further details of the instruction decode units of FIG. 5, in accordance with one or more aspects of the present invention.

Further details of an instruction decode unit are described with reference to FIG. 6. In one example, each decoder includes prefix detection and transmission logic 600 and prefix reception logic 602, as well as other logic.

Prefix detection and transmission logic 600 detects if the instruction received by the decoder is a prefix instruction, and if it is, it is forwarded to prefix reception logic 602 of a neighboring instruction unit decoder 506. For instance, prefix detection and transmission logic 600 checks the opcode of the instruction and determines that it is a prefix instruction. It then forwards the instruction to the next instruction decode unit in succession. As an example, if prefix detection and transmission logic 600 of ID0 detects that the instruction is a prefix instruction, then it forwards the instruction to ID1. Reception logic 602 of ID receives the prefix instruction, which is to be used with the instruction received at ID1 by prefix detection and transmission logic 600 of ID1. The prefix instruction and the instruction to be modified by the prefix instruction (i.e., the prefixed instruction) are decoded together.

In one embodiment, a determination of the presence of a prefix may be made by a single instruction decode unit to which the prefix is assigned, thereby initiating the combining of the prefix and the prefixed instruction.

Figure 7:
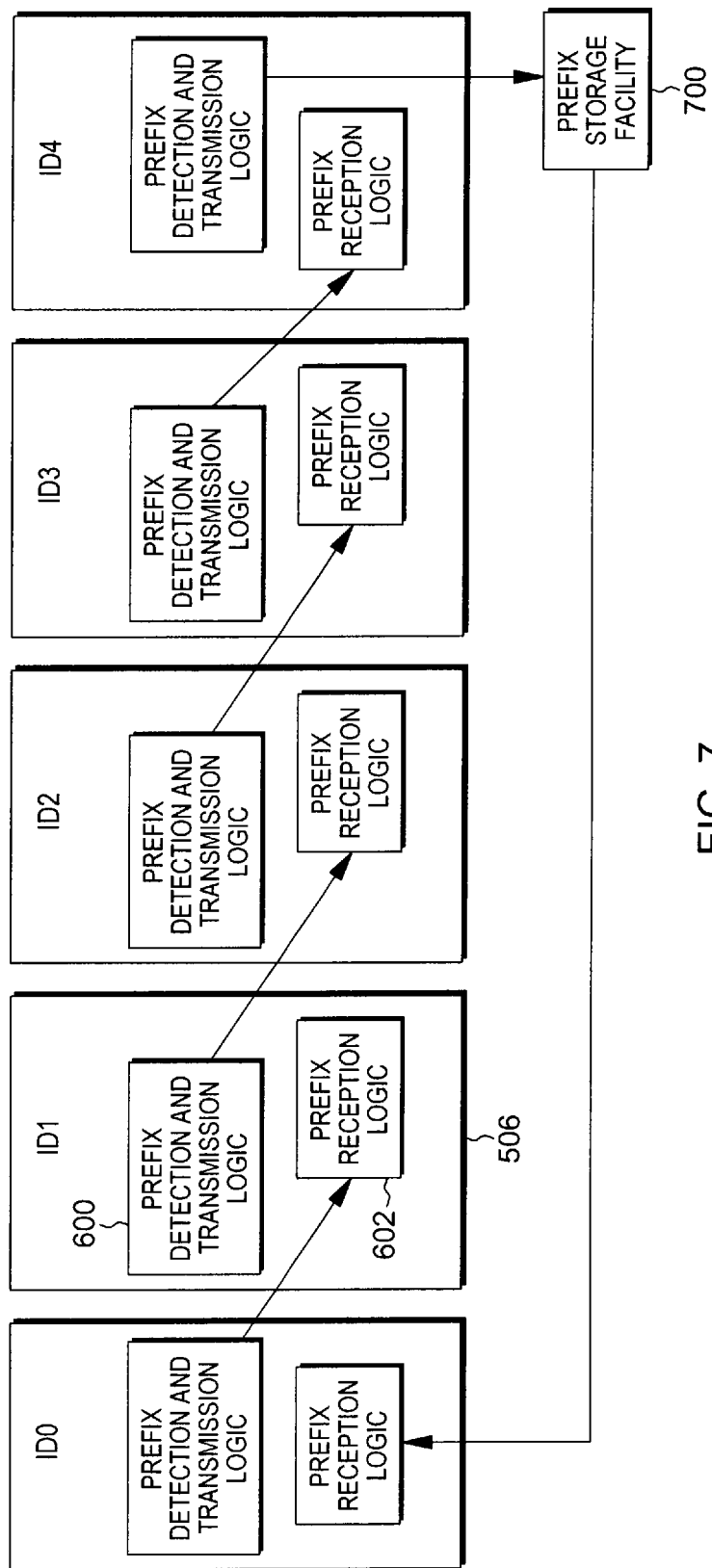
FIG. 7 depicts one example of a prefix storage facility used in accordance with one or more aspects of the present invention.

In a further embodiment, referring to FIG. 7, a prefix storage facility 700 is provided in the event that the last decoder unit in the group of decoder units includes the prefix instruction. This is to accommodate the fact that the last decoder has no "next" decoder in which to forward the prefix instruction. The prefix instruction is saved in prefix storage facility 700, and then forwarded to the first decoder (ID0) of the next group of instruction units to be decoded. Therefore, the prefix instruction is united with the instruction to be prefixed, and they are decoded together. In one embodiment in which there are multithreaded processors, i.e., processors with hardware multithreading or simultaneous multithreading, multiple prefix storage facilities 700 may be present, one for each thread.

Subsequent to decoding, the decoded instructions may be executed. As part of execution, debugging may be performed, and this debugging is to take into account the prefix and/or prefixed instructions, in accordance with an aspect of the present invention.

For example, a debug capability is provided, in accordance with an aspect of the present invention, to manage the debugging of prefixed code. Debugging includes, for instance, code updating in order to insert trap instructions to establish breakpoints in the code being debugged. As examples, a breakpoint may be set either over a prefix instruction or a prefixed instruction, as well as over non-prefix/prefixed instructions. Further, many different types of trap instructions may be used. In accordance with an aspect of the present invention, a trap may be immutable to a prefix instruction in that the prefix is not applied to the trap instruction. Instead, an indication of the prefix instruction may be provided. Further, in accordance with an aspect of the present invention, the trap ignores the prefix in execution. In one example, the prefix is not even applied. In other examples, if the prefix is applied, it is ignored in that it has no effect on the trap. Other possibilities exist.

In accordance with an aspect of the present invention, when a breakpoint is set over a prefixed instruction, then execution halts without regard to the fact that the prefixed instruction has been replaced by a trap breakpoint. Control is transferred to, e.g., debug control. In such an embodiment, when execution is restarted, the breakpoint is replaced by the prefixed instruction and execution resumes at the prefix instruction. In accordance with one aspect, an indication of whether a prefix was present is recorded when the breakpoint is recognized.

Further, in accordance with an aspect of the present invention, a breakpoint trap is defined that is immutable subject to a prefix instruction, i.e., the trap executes a breakpoint without regard to whether a prefix is present or not. When a breakpoint is set over a prefixed instruction, then execution halts without regard to the fact that the trap was preceded by a prefix instruction and the prefixed instruction has been replaced by a trap breakpoint. Control is transferred to, e.g., debug control. In accordance with such an embodiment, when execution is restarted, the breakpoint is replaced by the prefixed instruction and execution resumes at the prefix instruction.

One embodiment of processing associated with debugging prefixed code is described with reference to FIG. 8. This logic is performed by a processor executing the code, in one example.

Figure 8:
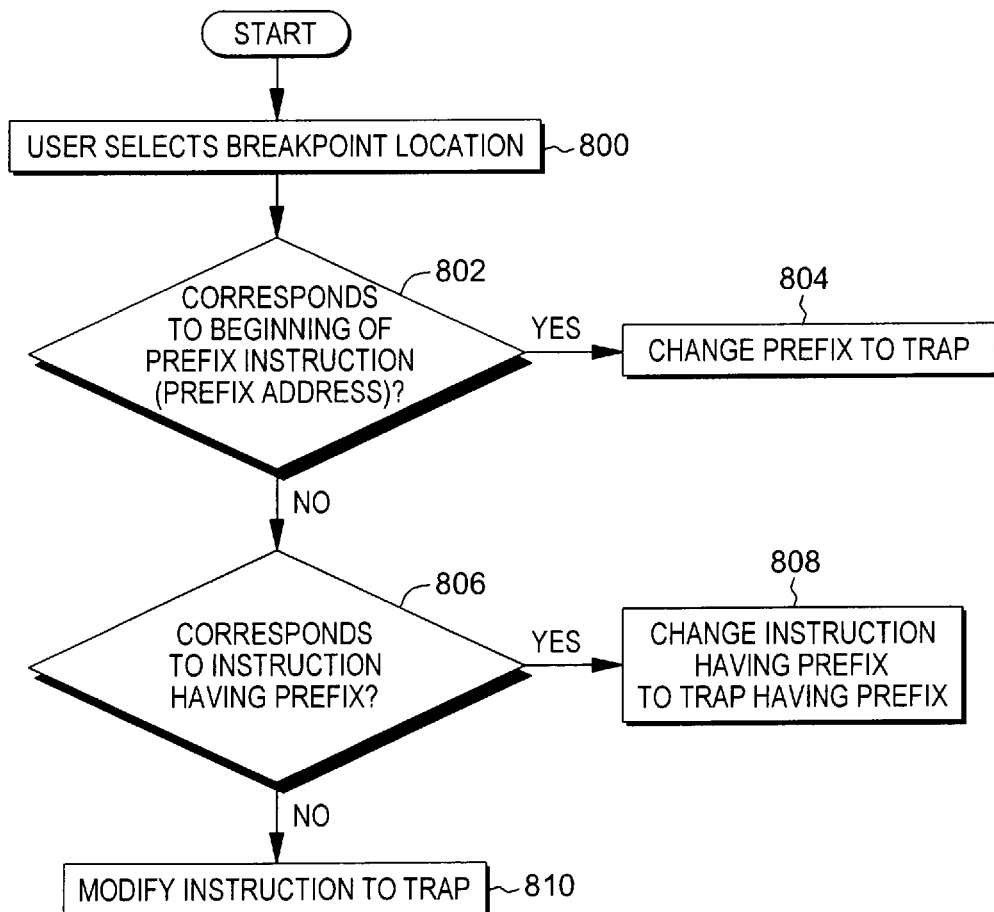
FIG. 8 depicts one embodiment of logic used to include traps within prefixed code, in accordance with an aspect of the present invention.

Referring to FIG. 8, a user selects a breakpoint location, STEP 800. A breakpoint may be inserted at a particular line of source code or at a particular instruction, as examples. For instance, a trap may be placed by a debugger (e.g., debug control, such as debug 136 or debug facility 224) executing on the processor over non-prefixed instructions to set breakpoints, over instruction prefixes, and/or over prefixed instructions.

During code execution, when a breakpoint is encountered, the debug control checks whether it corresponds to the beginning of a prefix instruction, INQUIRY 802. If the breakpoint does correspond to the beginning of a prefix instruction, then the prefix instruction is changed to a trap, STEP 804. That is, a code update is performed to replace the prefix instruction with a trap instruction. The trap instruction causes execution of the application to halt and allows other processing to be performed related to debugging. On restart of the application, the trap is replaced with the prefix instruction and execution is restarted at the prefix instruction.

However, if the breakpoint location does not correspond to the beginning of a prefix instruction, INQUIRY 802, then a further determination is made as to whether it corresponds to an instruction having a prefix (i.e., a prefixed instruction), INQUIRY 806. If the location does correspond to a prefixed instruction, then the prefixed instruction is replaced by a trap instruction having a prefix, STEP 808. However, in accordance with an aspect of the present invention, although the trap instruction has a prefix, the prefix is ignored; e.g., it is not applied to the trap instruction (i.e., operands of the trap instruction are not overridden by the prefix instruction and/or immediate fields of the trap instruction are not modified by the prefix instruction). The trap is performed as if the prefix was not present.

On restart, the trap is replaced with the prefixed instruction and execution is restarted at the prefix. A determination may be made as to what address should be reported. If the trap is reported, either the prefix address is reported or an address of the trap with an indication that a prefixed trap was taken is reported, as examples. Further, a size of the prefix may be reported. If it is a variable width Instruction Set Architecture, the prefix length (e.g., the prefix instruction length code (ILC)) may be reported.

Returning to INQUIRY 806, if, however, the breakpoint instruction does not correspond to a prefixed instruction, then the instruction is replaced by a trap instruction and processing is performed, as is known, STEP 810.

Further details relating to traps for prefixed code are described with reference to FIG. 9. As one example, this logic is performed by a processor executing the application code being debugged.

Figure 9:
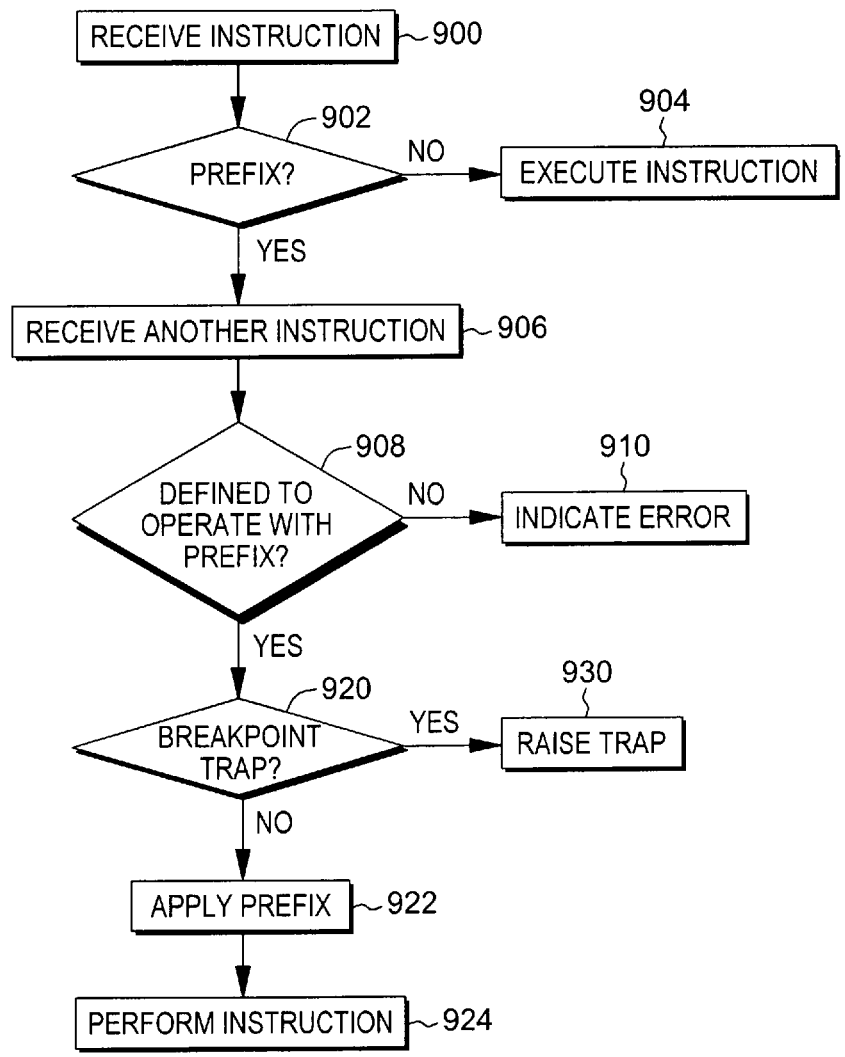
FIG. 9 depicts one embodiment of logic associated with using traps in prefixed code, in accordance with an aspect of the present invention.

Referring to FIG. 9, initially, an instruction is received, STEP 900, and a determination is made as to whether the received instruction is a prefix instruction, INQUIRY 902. If it is not a prefix instruction, then the instruction is executed, as in conventional processing, STEP 904. However, if it is a prefix instruction, INQUIRY 902, then another instruction is received, STEP 906. This instruction is referred to as the prefixed instruction since it may be modified by the prefix instruction.

Based on receiving the prefixed instruction, a determination is made as to whether the prefixed instruction is defined to operate with the prefix instruction, INQUIRY 908. If the prefixed instruction is not defined to operate with the prefix instruction, then an error is indicated, STEP 910. However, if the instruction is defined to support prefixing, then a further determination is made as to whether the prefixed instruction has been replaced with a breakpoint trap, INQUIRY 920. If the prefixed instruction has not been replaced by a trap, then the prefix specified by the prefix instruction is applied, STEP 922. For instance, if an operand override is specified by the prefix, then at least a portion of the operand of the prefixed instruction is overridden, and/or if additional bits are to be employed with a displacement of the prefixed instruction, those bits are employed, etc. The instruction is then performed, STEP 924.

Returning to INQUIRY 920, if, however, the prefixed instruction has been replaced by a breakpoint trap, the trap is raised, STEP 930. That is, it indicates the breakpoint has been encountered. In one embodiment, the indication of the breakpoint includes indicating the presence of the prefix. Based on raising the trap, processing of the instruction is halted, and debug processing is performed. In accordance with at least one embodiment, processing is halted by indicating an exception in accordance with an exception definition for an architecture supporting prefixed instructions.

As indicated above, when a user selects a breakpoint location, an instruction is changed to a breakpoint trap. In one example, this is performed by updating the code to replace the instruction with the breakpoint trap. Further details regarding one embodiment of code replacement are described below.

In accordance with one embodiment, multiple trap instructions are defined. For example, a breakpoint trap may be defined to accept and indicate the presence of a prefix. However, in accordance with such embodiment, the behavior of the trap instruction is not modified, and no operands are overridden, or displacements extended, even in the presence of a prefix indicating one of an operand override and an expanded addressing range displacement. The breakpoint trap is, for instance, a version of a general trap instruction wherein the selected form of the breakpoint trap instruction is immutable to a prefix.

One particular example of a trap instruction is, e.g., a trap word immediate instruction in accordance with the Power ISA, wherein a conditional trap instruction is implemented, the trap instruction being adapted to raise a trap if a condition is met. In one embodiment, this trap word immediate instruction may be modified by a prefix and provide trap conditions with expanded addressing ranges and overridden operands. However, in accordance with an aspect of the present invention, an immutable form of the trap word immediate instruction may be provided. For example, the immutable form may be "twi 31,0,0" which is adapted to raise an exception regardless of the specified condition responsive to the condition selector TO=31 which directs a processor to raise an exception responsive to any possible conditions. Here, the prefix would be ignored altogether, or it may be applied, and then ignored during execution of the trap instruction.

In accordance with one embodiment, concurrent code modification and execution to simplify code updates is employed. The phrase "concurrent modification and execution of instructions" (CMODX) refers to the case in which a processor fetches and executes an instruction from instruction storage which is not consistent with data storage or which becomes inconsistent with data storage prior to the completion of its processing.

This is further explained below, in which the following terminology is used:
   Location X is an arbitrary word-aligned storage location.
   X0 is the value of the contents of location X for which software has made the location X in instruction storage consistent with data storage.
   X1, X2, . . . , Xn are the sequence of the first n values occupying location X after X0.
   Xn is the first value of X subsequent to X0 for which software has again made instruction storage consistent with data storage.

The "patch class" of instructions consists of the I-form Branch instruction (b[I][a]) and a no-op instruction (ori 0,0,0).

If the instruction from location X is executed after the copy of location X in instruction storage is made consistent for the value X0 and before it is made consistent for the value Xn, the results of executing the instruction are defined if and only if the following conditions are satisfied.
   1. The stores that place the value X1, . . . , Xn into location X are atomic stores that modify all four bytes of location X.
   2. Each Xi, 0 [i [n, is a patch class instruction.
   3. Location X is in storage that is Memory Coherence Required.

If these conditions are satisfied, the result of each execution of an instruction from location X will be the execution of some Xi, 0≤i≤n. The value of the ordinate i associated with each value executed may be different and the sequence of ordinates i associated with a sequence of values executed is not constrained (e.g., a valid sequence of executions of the instruction at location X could be the sequence Xi, Xi+2, then Xi−1). If these conditions are not satisfied, the results of each such execution of an instruction from location X are boundedly undefined, and may include causing inconsistent information to be presented to the system error handler.

In accordance with an embodiment offering concurrent code modification and execution to simplify code updates, either a prefix or a prefixed instruction may be replaced atomically. When a prefix is replaced, such a transition will be atomic at least with respect to instructions which are defined to be atomic, and an instruction executing in spite of an executed prefix will recognize the contents prior to the trap having been inserted, or recognize a trap.

Updating a prefix means either the instruction with the prefix is seen, or the prefix replaced with a new instruction is seen. Updating a prefixed instruction means either the prefix with the old instruction or the prefix with the new instruction is seen.

If both the prefix and the instruction have to be updated: modify the prefix to hold (e.g., branch to self; trap (with operating system cooperation)); modify the prefixed instruction; and modify the hold instruction to the new prefix.

Similarly, based on CMODX rules, when a trap is inserted in lieu of an instruction, the trap will either be recognized (and ignoring the prefix, other than recording its presence and possibly contents in a manner desirable by the architecture for a recognized exception), or the prefixed instruction will execute as if no trap has been inserted and using the value of the prefix.

Described in detail above is a debug capability that manages code with prefixed instructions. As described herein, when a prefixed instruction is replaced by a trap, the trap includes the prefix, but the prefix is ignored in that it does not alter how the trap is conventionally performed.

Figure 10:
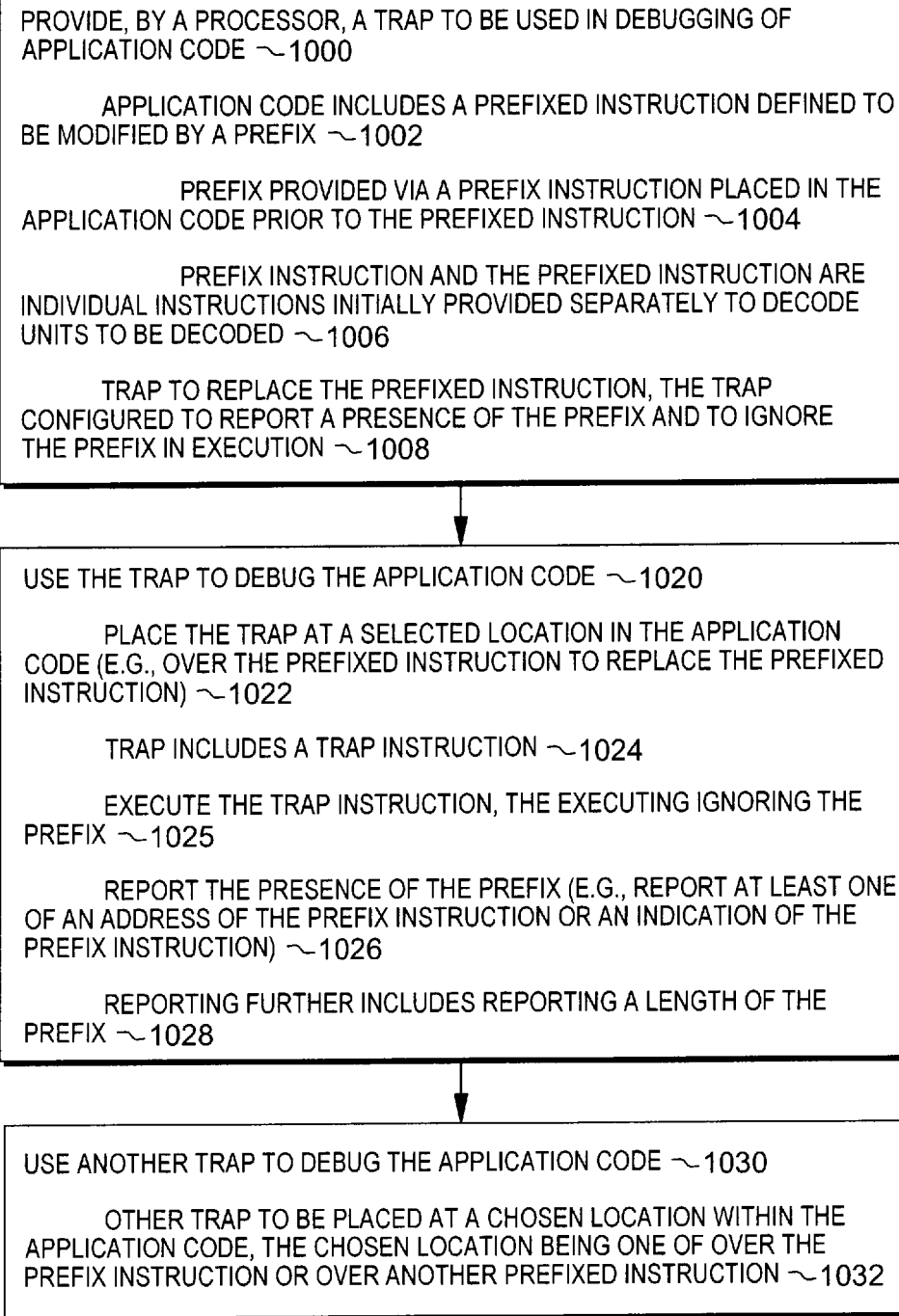
FIG. 10 depicts one embodiment of logic to facilitate debugging of prefixed code, in accordance with an aspect of the present invention.

One embodiment of processing associated with debugging prefixed code is described with reference to FIG. 10. In one example, a processor provides a trap to be used in debugging of application code, STEP 1000. The application code includes a prefixed instruction defined to be modified by a prefix (1002). The prefix is provided, in one example, via a prefix instruction placed in the application code prior to the prefixed instruction (1004). As an example, the prefix instruction and the prefixed instruction are individual instructions initially provided separately to decode units to be decoded (1006). The trap is to replace the prefixed instruction (1008). The trap is configured to report a presence of the prefix and to ignore the prefix in execution (e.g., not apply the prefix to the trap).

The trap is used to debug the application code, STEP 1020. As one example, the trap is placed at a selected location in the application code (e.g., over the prefixed instruction to replace the prefixed instruction), STEP 1022. In one example, the trap includes a trap instruction, STEP 1024, and the trap instruction is executed, STEP 1025, in which the executing ignores the prefix (e.g., does not apply the prefix to the trap instruction).

In one embodiment, the presence of the prefix is reported, STEP 1026. For example, at least one of an address of the prefix instruction or an indication of the prefix instruction is reported. Further, a length of the prefix may be reported, STEP 1028.

In a further aspect, another trap is used to debug the application code, STEP 1030. The other trap is to be placed at a chosen location within the application code, the chosen location being one of over the prefix instruction or over another prefixed instruction, STEP 1032.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 11:
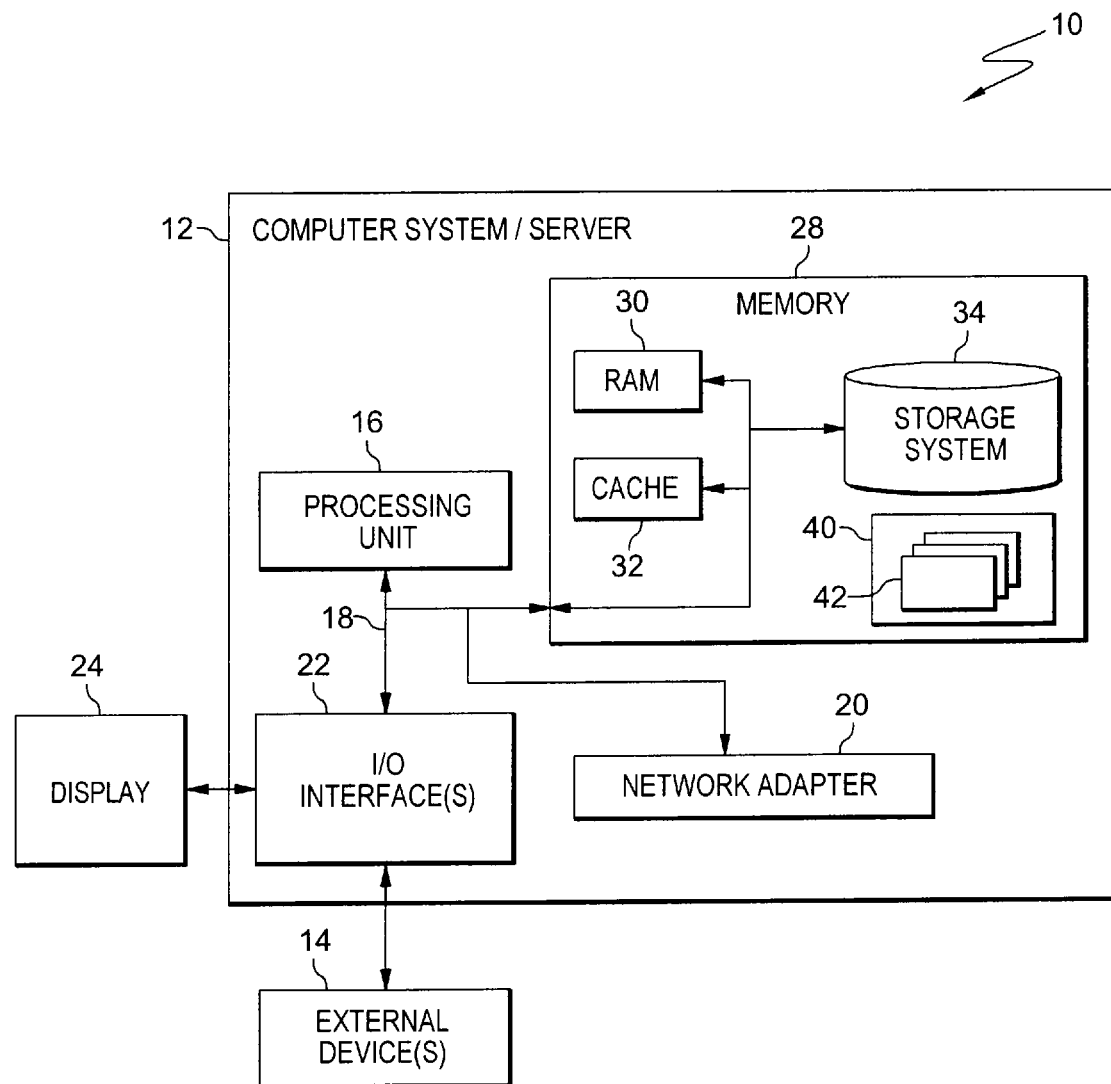
FIG. 11 depicts one embodiment of a cloud computing node.

Referring now to FIG. 11, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 12:
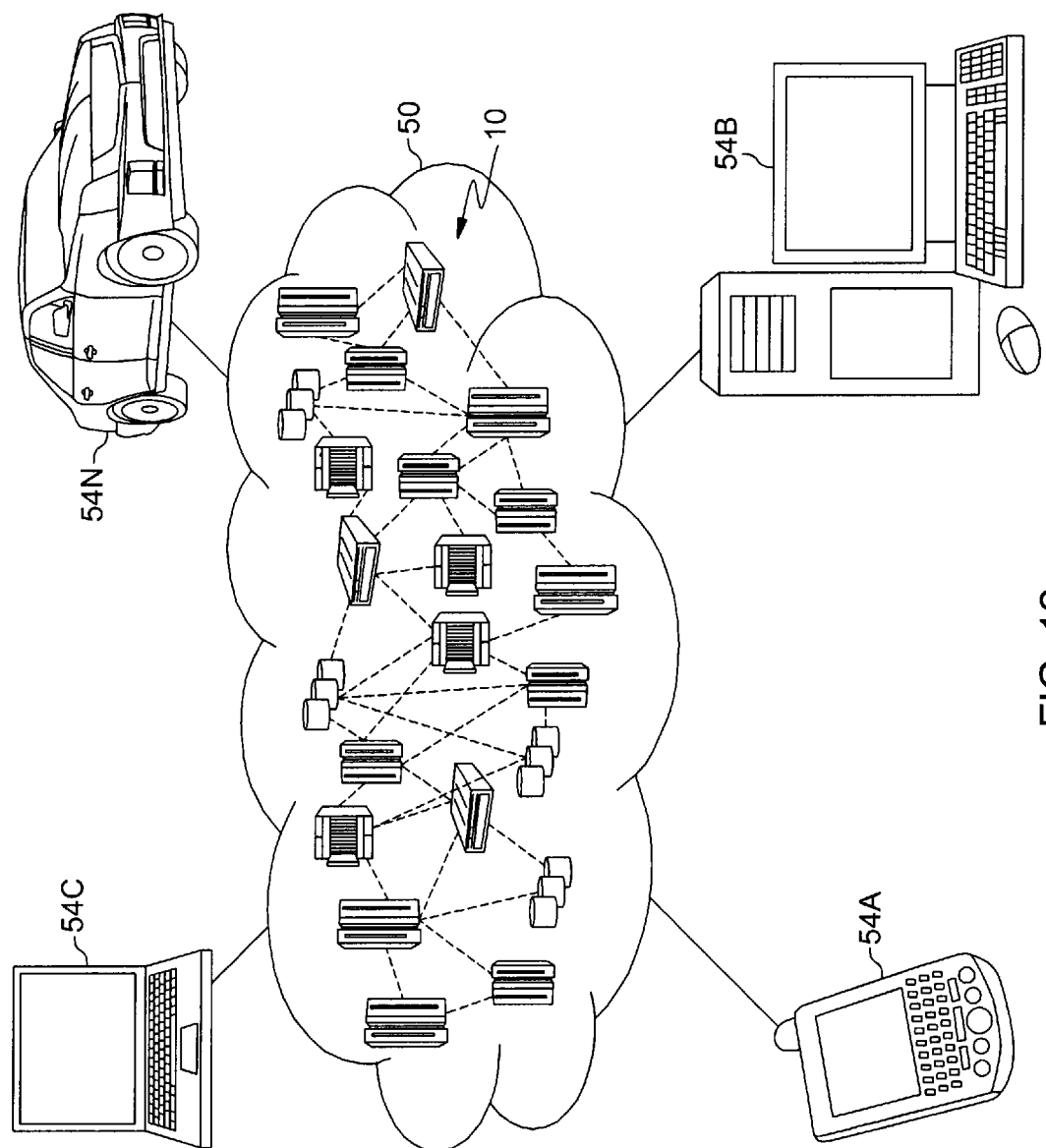
FIG. 12 depicts one embodiment of a cloud computing environment.

Referring now to FIG. 12, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 12 are intended to be illustrative only and that computing nodes 10 and cloud computing environment 50 can communicate with any type of computerized device over any type of network and/or network addressable connection (e.g., using a web browser).

Figure 13:
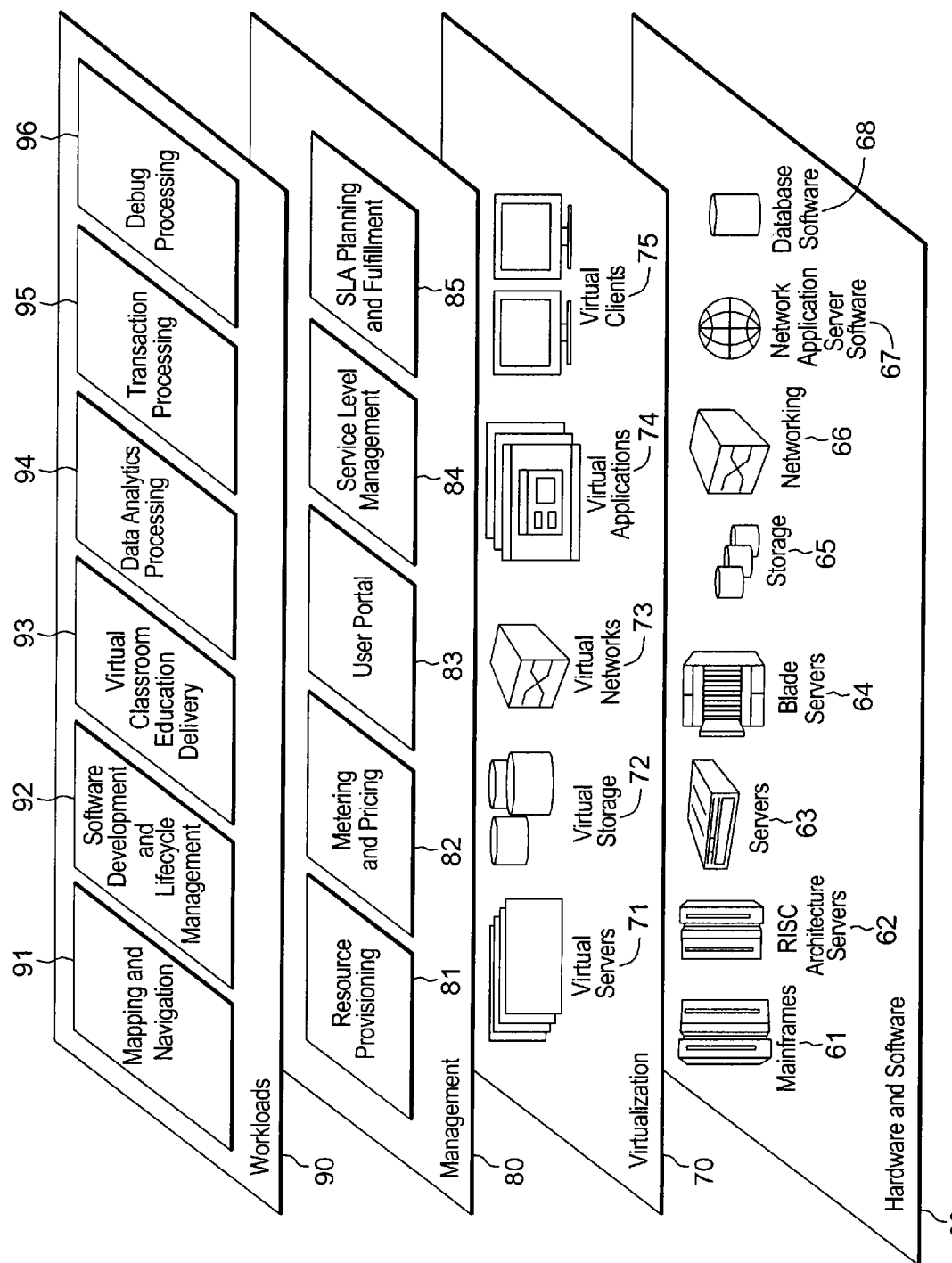
FIG. 13 depicts one example of abstraction model layers.

Referring now to FIG. 13, a set of functional abstraction layers provided by cloud computing environment 50 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and debug processing 96.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating debugging of applications, the computer program product comprising:
   a non-transitory computer readable storage medium readable by a processing circuit and storing instructions for execution by the processing circuit for performing a method comprising:
      providing, by one or more processors, a trap to be used in debugging of application code, the application code including a prefixed instruction, and the trap to replace the prefixed instruction by placing the trap at a selected location in the application code, wherein the selected location includes over the prefixed instruction, the trap configured to ignore the prefix in execution;
      executing, by the one or more processors, the application code, wherein the executing comprises ignoring that the trap is preceded by a prefix instruction and halting the executing at the trap and transferring control to a debug control; and
      based on the transferring, performing processing related debugging of the application code.

2. The computer program product of claim 1, wherein the prefix is provided via a prefix instruction placed in the application code prior to the prefixed instruction.

3. The computer program product of claim 2, wherein the prefix instruction and the prefixed instruction are individual instructions initially provided separately to decode units to be decoded.

4. The computer program product of claim 1, the method further comprising:
   restarting, by the one or more processors, execution of the application code at the prefixed instruction.

5. The computer program product of claim 4, wherein the restarting comprises:
   replacing, by the one or more processors, the trap with the prefixed instruction; and
   resuming execution of the application code at the prefixed instruction.

6. The computer program product of claim 4, wherein the method further comprises using another trap to debug the application code, the other trap to be placed at a chosen location within the application code, the chosen location being one of over the prefix instruction or over another prefixed instruction.

7. The computer program product of claim 1, wherein executing the application code further comprises:
   reporting the presence of the prefix.

8. The computer program product of claim 7, wherein the reporting the presence of the prefix includes reporting at least one of an address of the prefix instruction or an indication of the prefix instruction.

9. The computer program product of claim 7, wherein the reporting the presence of the prefix includes reporting an address of the trap and an indication that the trap was taken.

10. The computer program product of claim 8, wherein the reporting further comprises reporting a length of the prefix.

11. The computer program product of 1, wherein the prefixed instruction is defined to be modified by a prefix.

12. The computer program product of 1, wherein the trap is further configured to report a presence of the prefix.

13. A computer system for facilitating debugging of applications, the computer system comprising:
   a memory; and
   one or more processors in communication with the memory, wherein the computer system is configured to perform a method, said method comprising:
      providing, by the one or more processors, a trap to be used in debugging of application code, the application code including a prefixed instruction, and the trap to replace the prefixed instruction by placing the trap at a selected location in the application code, wherein the selected location includes over the prefixed instruction, the trap configured to ignore the prefix in execution;
      executing, by the one or more processors, the application code, wherein the executing comprises ignoring that the trap is preceded by a prefix instruction and halting the executing at the trap and transferring control to a debug control; and
      based on the transferring, performing processing related debugging of the application code.

14. The computer system of claim 13, wherein the prefix is provided via a prefix instruction placed in the application code prior to the prefixed instruction.

15. The computer system of claim 14, wherein the prefix instruction and the prefixed instruction are individual instructions initially provided separately to decode units to be decoded.

16. The computer system of claim 13, the method further comprising:
   restarting, by the one or more processors, execution of the application code at the prefixed instruction.

17. The computer system of claim 16, wherein the restarting comprises:
   replacing, by the one or more processors, the trap with the prefixed instruction; and
   resuming execution of the application code at the prefixed instruction.

18. The computer system of claim 16, wherein the method further comprises using another trap to debug the application code, the other trap to be placed at a chosen location within the application code, the chosen location being one of over the prefix instruction or over another prefixed instruction.

19. The computer system of claim 13, wherein the prefixed instruction is defined to be modified by a prefix.

20. The computer system of claim 13, wherein the trap is further configured to report a presence of the prefix.

* * * * *